United States Patent [19]

Lapeyre

[11] Patent Number: 5,099,985
[45] Date of Patent: Mar. 31, 1992

[54] UNITARY SCREW CONVEYOR APPARATUS

[75] Inventor: James M. Lapeyre, New Orleans, La.

[73] Assignee: The Laitram Corporation, New Orleans, La.

[21] Appl. No.: 469,686

[22] Filed: Jan. 26, 1990

Related U.S. Application Data

[63] Continuation of Ser. No. 223,711, Jul. 22, 1988, abandoned, which is a continuation of Ser. No. 44,358, Apr. 30, 1987, abandoned, which is a continuation-in-part of Ser. No. 888,282, Jul. 24, 1986, abandoned, which is a continuation of Ser. No. 537,345, Sep. 29, 1983, abandoned.

[51] Int. Cl.⁵ ............................................. B65G 33/12
[52] U.S. Cl. ..................................... 198/658; 198/666; 198/676
[58] Field of Search ............... 198/659, 662, 664, 666, 198/674, 676, 677, 658

[56] References Cited

U.S. PATENT DOCUMENTS

| | | | |
|---|---|---|---|
| 233,320 | 10/1880 | Brewer | 198/662 |
| 2,721,647 | 10/1955 | Witworth | 198/666 |
| 3,705,644 | 12/1972 | Kawchitch | 198/671 |
| 3,802,551 | 4/1974 | Somers | 198/659 |
| 4,691,818 | 9/1987 | Weber | 198/666 |
| 4,746,384 | 5/1988 | Tan | 198/666 |

FOREIGN PATENT DOCUMENTS

| | | | |
|---|---|---|---|
| 138066 | 4/1985 | European Pat. Off. | 198/658 |
| 208461 | 1/1940 | Switzerland | 198/658 |

*Primary Examiner*—Joseph E. Valenza
*Attorney, Agent, or Firm*—Laurence R. Brown; James T. Cronvich

[57] ABSTRACT

Screw conveyor apparatus fabricated from integrally molded plastic modules is disclosed. The apparatus includes a multiplicity of modules axially aligned and joined or bonded so as to provide a unitary plastic screw conveyor of a desired length. A plastic axial member extending the length of the screw conveyor and which defines an elongated aperture of a non-circular cross-section is formed by joining or bonding the individual modules. In addition, each of the modules include a flight member which individually helically encircle not more than 360°, but when bonded together result in an overall flight member encircling more than 360° and which extends the length of the joined or bonded modules. The plastic screw conveyor is driven by a drive shaft which has a non-circular cross-section and which is inserted through and cooperates with the non-circular aperture extending the length of the joined axial members. A drive or power source is connected to the drive shaft for rotating the apparatus.

14 Claims, 3 Drawing Sheets

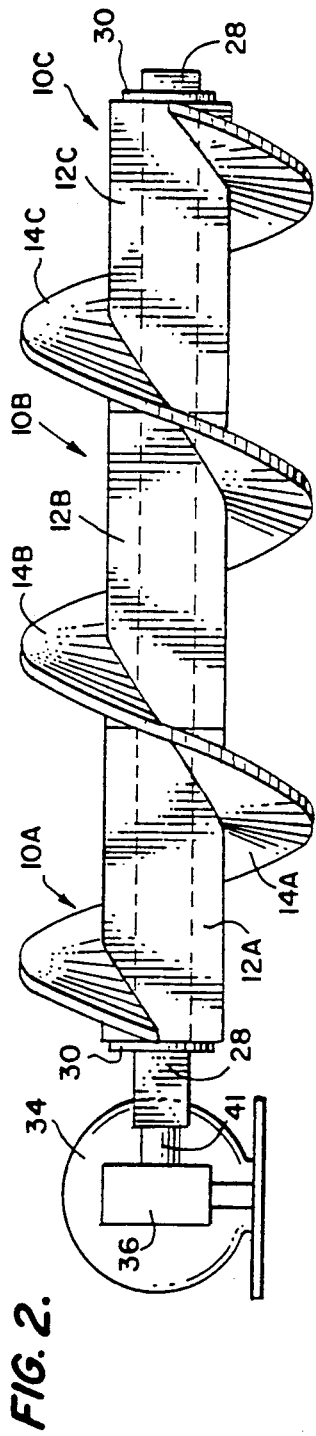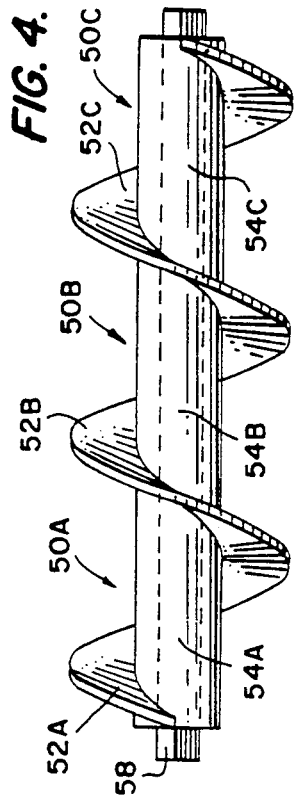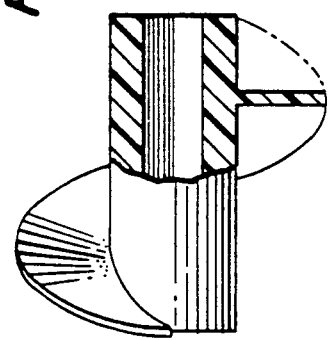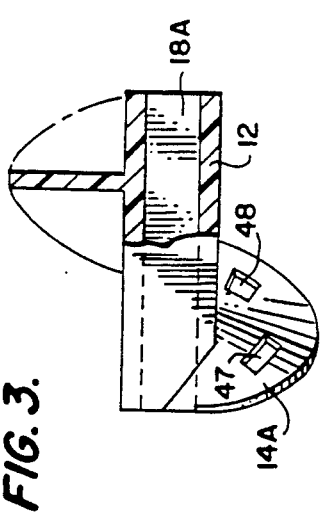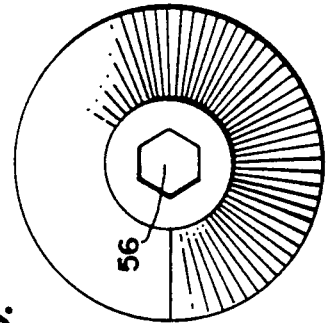

UNITARY SCREW CONVEYOR APPARATUS

This application is a continuation of the now abandoned co-pending application Ser. No. 07/223,711 filed July 22, 1988, which in turn is a continuation of abandoned application Ser. No. 07/044,358 filed Apr. 30, 1987 which is a continuation-in-part of abandoned application Ser. No. 888,282 filed July 24, 1986 which is a continuation of application Ser. No. 537,345 filed Sept. 29, 1983, now abandoned.

TECHNICAL FIELD

This invention relates to screw conveyors, and more particularly to a multiplicity of integrally molded screw conveyor modules joined end to end with a permanent bond to form a unitary screw conveyor structure of any selected length.

BACKGROUND ART

As will be appreciated by those skilled in the art, helical shaped devices include such items as the common screw and the like. In addition, specialized helical shaped devices such as screw conveyors are well known for the transport of various types of bulk material. Such conveyors generally include a helical shaped member which rotates within a housing or trough such that rotation of the screw conveyor along its longitudinal or central axis results in movement of the bulk material along the length of the device. In the past, such conveyors were typically constructed from metal, and each conveyor was specifically designed for a particular purpose and of the necessary length. However, although most prior art conveyors were specifically designed to meet a particular application, there have been some attempts at providing a modular type conveyor. Examples of U.S. patents which disclose such modular conveyors include U.S. Pat. No. 233,320 issued to A. L. Brewer on Oct. 19, 1888; U.S. Pat. No. 455,384 issued to H. Binkholz on July 7, 1891; U.S. Pat. No. 525,194 issued to J. Dyson, et al on Aug. 20, 1894; U.S. Pat. No. 546,879 issued to J. Dyson, et al on Sept. 24, 1895; U.S. Pat. No. 1,090,956 issued to W. J. Zinteck on Mar. 24, 1914; U.S. Pat. No. 1,867,573 issued to V. G. Leach on July 19, 1932; U.S. Pat. No. 2,394,163; U.S. Pat. No. 2,492,915 issued to A. B. Carlson on Dec. 27, 1949; U.S. Pat. No. 3,178,210; U.S. Pat. No. 3,648,826 issued to Dean P. Brooks on March 1972; and U.S. Pat. No. 3,705,644 issued to C. E. Kawchitch on Dec. 12, 1972.

Thus, a review of the prior art patents reveals that to date, only the Kawchitch patent shows a modular plastic screw conveyor, and none of the prior art including Kawchitch even suggests bonding a multiplicity of plastic modules axially to produce a unitary plastic screw conveyor of any desired length with a continuous flight member extending the length of the conveyor. Therefore, it is an object of this invention to provide a unitary plastic screw conveyor having an axial member of any selected length and having a continuous flight member helically enclosing the full length of the axial member.

It is still a further object of the present invention to provide a unitary screw conveyor of any selected length formed of a multiplicity of modules which may be joined axially and wherein the flight member extends around the axial member greater than 360°.

Other objects and advantages will be obvious, and will in part appear hereinafter, and will be accomplished by the present invention which provides a conveyor apparatus having a unitary plastic screw conveyor which includes an axial member extending a selected or desired length. A flight member helically encircles more than 360° of the axial member and extends the length of the axial member.

The apparatus comprises a multiplicity of a substantially identical integrally molded plastic modules. Each of the modules includes an elongated axial member extending between a pair of ends and with a non-circular aperture which extends coaxially through the axial member. Each of the modules also includes a flight member which helically encircles nor more than 360° of the axial member and which extends between the pair of ends. Each of the ends of the axial members are formed to cooperate with one of the ends of another module. The plastic screw conveyor is formed by coaxially aligning the multiplicity of modules end-to-end such that the end of one module is in contact with the end of another module and so that the non-circular aperture through the modules are in register. The ends of the multiplicity of modules which are in contact are permanently joined or bonded so as to form a unitary screw conveyor having an axial member which defines an elongated aperture of a non-circular cross-section extending the length of the axial member. The unitary screw conveyor also includes a continuous flight member which encircles more than 360° of the axial member and which extends the length of the joined modules.

The screw conveyor formed of the multiplicity of permanently bonded modules is placed on a drive shaft which has a non-circular cross-section which may be substantially identical to the non-circular cross-section of the elongated aperture. Whether the drive shaft has an identical cross-section or not, it is received by and cooperate with the non-circular elongated aperture in a non-rotating manner such that rotation of the drive shaft causes rotation of the unitary screw conveyor. A drive means is provided for rotating the drive shaft.

BRIEF DESCRIPTION OF THE DRAWINGS

The above features of the present invention will be more clearly understood from consideration of the following description in connection with the accompanying drawings in which:

FIG. 2 is an elevation view of the apparatus of FIG. 1 fully assembled.

FIG. 3 is a partially sectional elevational view of one of the modules used in the screw conveyor apparatus of FIG. 1.

FIG. 4 is an elevational view of another embodiment of screw conveyor apparatus incorporating the features of this invention.

FIGS. 5 and 6 are an end view and partially sectional elevational view of one of the modules making up the screw conveyor apparatus of FIG. 4.

DETAILED DESCRIPTION OF THE INVENTION

Figure 1:
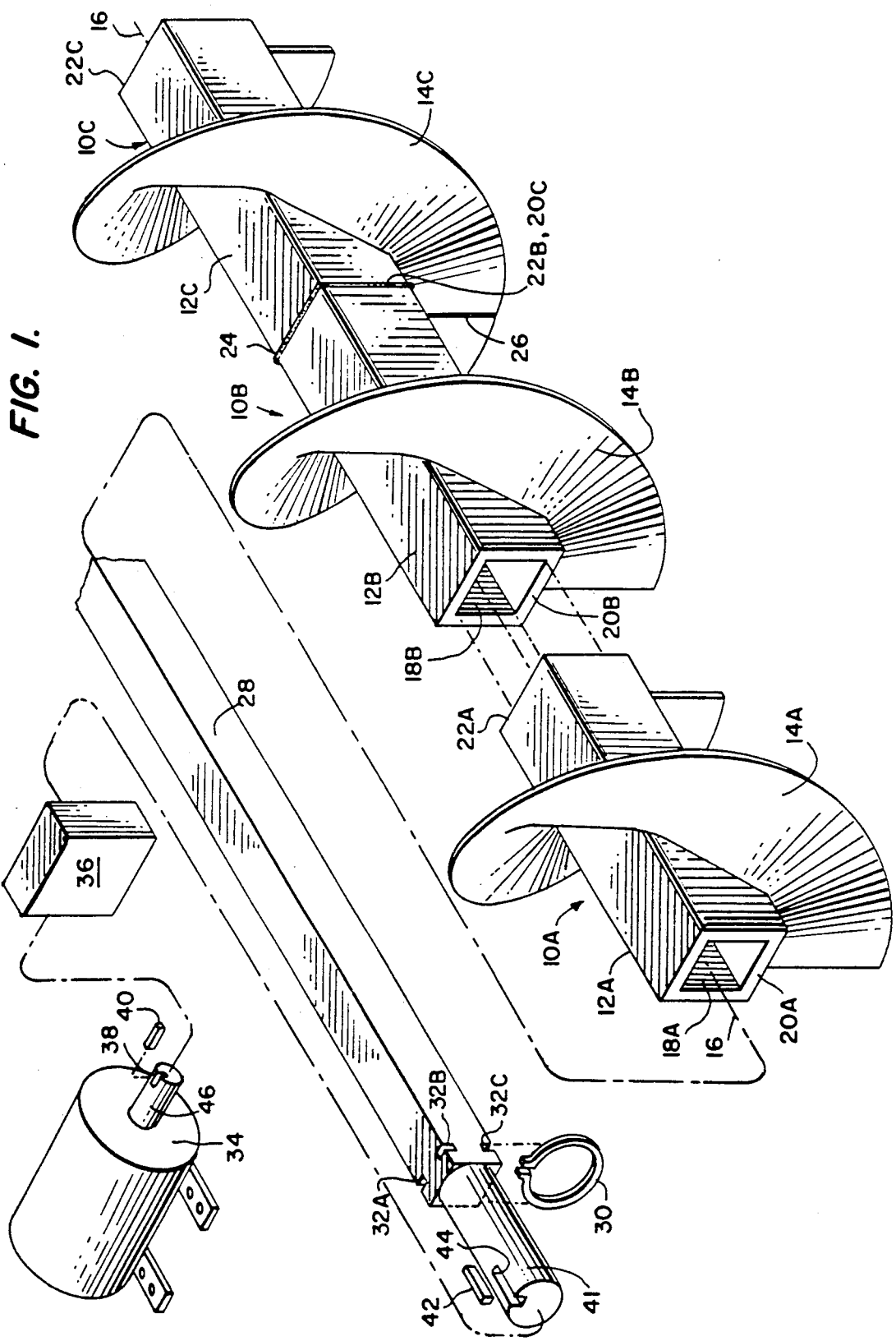
FIG. 1 is an exploded pictorial view of screw conveyor apparatus incorporating the technology of this invention.

Referring now to FIGS. 1 and 2, there is shown an exploded pictorial view and an assembled plan view respectively of a preferred embodiment of the screw conveyor apparatus of this invention. As shown, there are three integrally molded modules 10A, 10B and 10C for forming a screw conveyor of a selected length. The modules 10A, 10B and 10C are each integrally molded of a suitable plastic material such as polyethylene, polypropylene or polyurethane and include axial members 12A, 12B and 12C and flight members 14A, 14B and 14C. In the illustration of FIG. 1, the three modules are each aligned along longitudinal axis 16. Also, each module includes an aperture such as apertures 18A and 18B, which are defined by each module's axial member. As can be seen from module 10A, aperture 18A extends between two ends 20A and 22A. Each of the modules also includes a web or flight member 14A, 14B and 14C which helically encircle the respective axial members. In the preferred embodiment, the flight member will helically encircle substantially the full 360° but will actually be somewhat less than 360°, perhaps on the order of 359°. However, it should be understood that the flight member may also be selected to encircle substantially less than 360°. Also as is clearly shown, helical member 14A extends from one of the two ends 20A of axial member 12A to the second end 22A. That is, the helical member substantially extends the length of the axial member as it encircles approximately 360°. As shown, the two ends of the axial member of each of the modules are formed to cooperate with the ends of the axial member of the other modules.

In addition, confronting faces on the axial members such as faces 22B and 20C of adjacent modules 10B and 10C respectively, are permanently bonded in a fluid tight manner such that liquid on the outside of the screw conveyor cannot find its way to the aperture area 18B or 18C. This joining or permanent bonding may be achieved by any suitable technique including solvents, but is preferably accomplished by means of heating the two confronting faces of the axial members until they are partially melted and then joining the faces under pressure and allowing the two partially melted faces to solidify while in contact with each other thereby providing the fluid tight permanent bond or weld. A bead 24 between modules 10B and 10C illustrates the weld or bonding. Of course it should be appreciated that the formation of a bead such as 24 is not necessary in all types of welding or bonding, and in addition, such a bead may preferably be removed in the event such a bead is formed. In a similar manner, it would be appreciated that confronting face 22A of module 10A may be permanently bonded, joined or welded to confronting face 20B of module 10B in a similar manner as 10B and 10C were bonded. Thus it will be appreciated that any number of modules such as 10A, 10B and 10C may be joined to produce a continuous unitary screw conveyor of plastic material of any selected length.

In addition, it may also be preferable in some applications, but not all, that the flights of each module also be welded, bonded or joined in a manner similar to that of the confronting faces of the axial members. For example as shown in FIG. 1 the flights 14C of module 10C and flight 14B of module 10B are permanently bonded, welded or joined as indicated by the bead 26.

A non-circular drive shaft such as drive shaft 28 which has a square cross-section suitable for cooperating with the cross-section of the apertures in the individual modules, is inserted into and received by the full length of the joined multiplicity of modules. Thus, as can be seen drive shaft 28 extends the full length through apertures 18A, 18B and 18C (aperture 18C not shown) between face 20A of module 10A and confronting face 22C of module 10C. As will be discussed later, it is not necessary that the modules always use a square cross-section or that the drive shaft be of a square cross-section. The important requirement is that the aperture through the axial members of the individual modules be of a non-circular cross-section and that the cross-section of the drive shaft which is received by the apertures through the axial members be of a cooperating non-circular shape or cross-section. Thus, it will be appreciated that it is not even necessary that the cross-sectional shape of the drive shaft be precisely the same as that of the cross-sectional shape of the apertures in the modules, although such similarity of shape is preferable. It is only necessary that the cross-sectional shape of the drive shaft cooperate with the cross-sectional shape of the aperture in the modules such that rotation between the drive shaft and the modules cannot take place. Once drive shaft 28 has been fully inserted within the multiplicity of joined or welded modules, it is typically preferable to secure the modules on the drive shaft by suitable means. Although many techniques may be used to secure the modules on the shaft, a simple and inexpensive technique may be accomplished by the use of simple snap-rings such as snap-ring 30 placed in a groove around the perimeter of the drive shaft such as illustrated by grooves 32A, 32B and 32C. Thus, it will be appreciated that once snap-ring 30 is located in the grooves 32A, 32B and 32C, then it will be impossible for the modules to move over the shaft past the snap-ring. The other end although not shown may also be secured in a similar manner.

Drive shaft 30 as shown in FIG. 1 may be driven by any suitable driving means such as electric motor 34. As shown, electric motor 34 is coupled to a gear box 36 by means of a keyway 38 and key means 40. In a similar manner, the cylindrical part 41 of the drive shaft 28 also is coupled to the gear box 36 by a key 42 and a keyway 44. Thus, it will be appreciated that rotation of the shaft 46 of motor 34 will result in rotation of the drive shaft 28 which in turn will rotate the multiplicity of permanently welded or joined screw conveyor modules 10A, 10B and 10C. Thus, there has been at this point been described a unique apparatus which includes a unitary plastic conveyor portion of apparatus no where before used or found in the prior art.

FIG. 3 is an illustration of the module 10A showing a partial cross-section so as to reveal the aperture extending through the axial member 12 of the module. FIG. 3 also illustrates how the flight member 14A of a module may also include holes 47 and 48 to allow the passage of material from one side of the flight member to the other side.

Referring now to FIGS. 4, 5 and 6, there is shown another embodiment of the present invention. As shown, a series of modules 50A, 50B and 50C, each have a helical flight member 52A, 52B and 52C which encircle somewhat less than 360° of bonded or joined axial members 54A, 54B and 54C respectively. As can be seen, the arrangement of FIGS. 4, 5 and 6 is substantially the same as that of FIGS. 1, 2 and 3, except that the axial members 54A, 54B and 54C have a circular cross-section on the outside perimeter rather than a square cross-section. In addition the apertures through the axial members of the modules as illustrated in FIG. 5 by reference number 56, have a hexagon non-circular shape rather than a square non-circular shape. It will also be appreciated, that the drive shaft 58 which extends through the aperture 56 of the modules will typically have a cooperating hexagon shape. Also as was the case with the embodiment discussed in FIGS. 1 through 3, the flights may also be welded to each other. FIG. 6 simply shows a partial cross-section of the plastic module having an axial member with a cylindrical outside surface and a hexagon shaped aperture.

Figure 7:
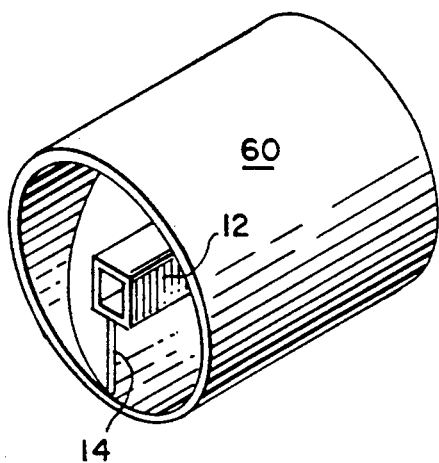
FIGS. 7, 8 and 9 show an end view, a pictorial view and a cross-sectional view of still other type of modules suitable for use in the apparatus of the present invention.
Figure 8:
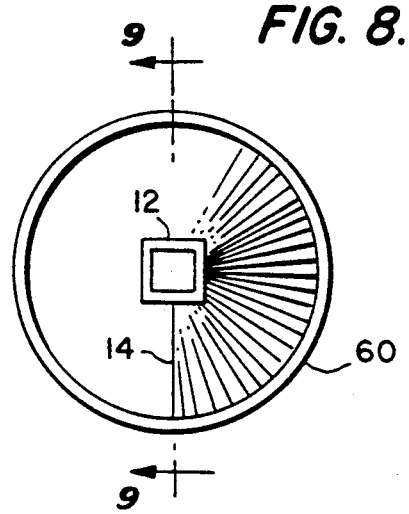
Figure 9:
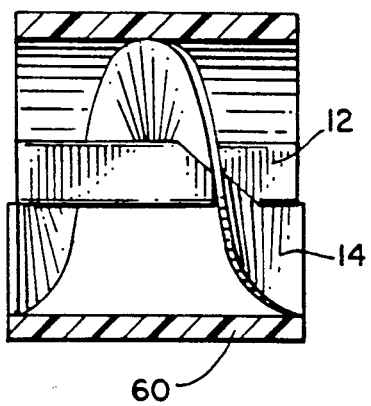

Referring now to FIGS. 7, 8 and 9, there is shown a perspective view, an end view, and a cross-sectional view of a different type module suitable for use in the present invention. As shown the modules illustrated in FIG. 7 through 9, are substantially the same as that illustrated in FIGS. 1 through 3, except each of the modules further includes a large outer cylindrical shell member 60 which is integrally molded and formed with the flight member 14. It will be appreciated of course that welding of the modules illustrated in FIG. 7 through 9 will be accomplished in substantially the same way as was discussed with respect to the welding of modules illustrated in FIGS. 1 through 6. To accomplish such welding, in addition to welding the hub member 12, it will typically also be desirable to weld both the flight 14 as well as the outer cylinder 60 of aligned and confronting modules.

Figure 10:
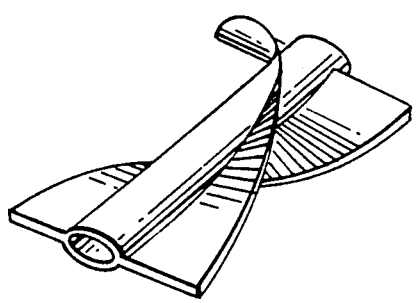
FIGS. 10, 11 and 12 show modules suitable for use with the present invention having two, three and four flight members respectively.
Figure 11:
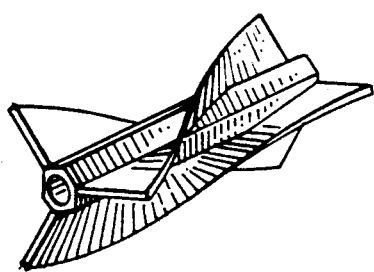
Figure 12:
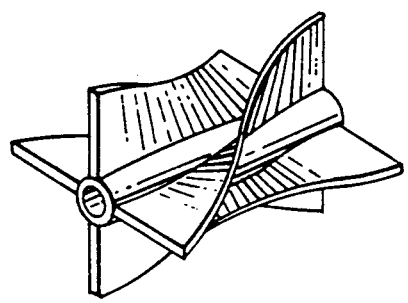

FIGS. 10, 11 and 12 show still other embodiments illustrating two, three and four flight members per module also suitable for use in the present invention. As can be seen from these illustrative examples, the flight members whether one, two, three or four do not cumulative encircle more than 360° of the axial member.

Thus, although there have been described to this point particular embodiments of the unitary screw conveying apparatus of the present invention, it is not intended that such specific references be considered as limitation upon the scope of this invention, except insofar as is set forth in the following claims.

I claim:

1. A unitary screw conveyor apparatus including an axial member extending a selected length, and a flight member which helically encircles more than 360° of said axial member, said apparatus comprising:
    a multiplicity of substantially identical integrally molded plastic modules, each module including a substantially rigid and straight elongated axial member extending between a pair of ends and having an aperture of substantially uniform non-circular cross-section extending coaxially therethrough, each module further including a flight member which helically encircles not more than 360° of said axial member and extends between ends, at least one end of any one of said multiplicity of modules formed to cooperate with at least one end of an adjacent other one of said multiplicity of modules;
    said multiplicity of modules being aligned coaxially such that, at least one end of said elongated axial member of each module axially confronts one end of said elongated axial member of an adjacent module so that the confronting ends of adjacent modules include areas in contact with each other around substantially the entire perimeter of said aperture, and such that said aperture through each of said multiplicity of modules is in register with the aperture of an adjacent module;
    said areas in contact with each other around the perimeter of said aperture of each of said confronting ends of said adjacent modules being permanently bonded to each other to form a unitary screw conveyor having a substantially rigid and straight elongated axial member defining an elongated aperture of a substantially uniform non-circular cross-section extending the length thereof and including a multiplicity of flight members which cumulatively encircle more than 360° of said axial member and substantially extend the length of said joined modules;
    a rigid and substantially straight drive shaft having a non-circular cross-section suitable for being received by and cooperating with said cross-section of said aperture of said modules in a non-rotatable manner, and said drive shaft extending axially through the in-register apertures of said aligned and bonded multiplicity of modules such that rotation of said drive shaft causes rotation of said unitary screw conveyor;
    means for retaining the multiplicity of permanently bonded modules on said drive shaft without bonding said modules to said drive shaft such that axial movement between said multiplicity of bonded modules and said drive shaft is limited; and
    means for rotatably driving said drive shaft.

2. The screw conveyor of claim 1 wherein said flight member of each of said multiplicity of modules is in register with said flight member of an adjacent module.

3. The screw conveyor apparatus of claim 2 wherein at least some of said in-register flight members are bonded to each other.

4. The screw conveyor apparatus of claim 1 and further including another flight member on each module also extending between said pair of ends, said flight member and said another flight member together enclosing no more than 360° and in a manner such that said flight member and said another flight member do not overlap.

5. The screw conveyor apparatus of claim 4 wherein said flight member on each module and said another flight member of each of said multiplicity of modules are in register.

6. The screw conveyor apparatus of claim 1, 2 or 5 wherein said multiplicity of modules is equal to two modules.

7. The screw conveyor apparatus of claim 1, 2 or 5 wherein said multiplicity of modules is greater than two modules.

8. The screw conveyor apparatus of claim 1, 2 or 5 wherein each end of said pair of ends are substantially identical.

9. The screw conveyor apparatus of claim 1 wherein the non-circular cross-section shape defines an outside shape of said axial member having substantially the same shape although larger than the cross-section shape of said aperture.

10. The screw conveyor apparatus of claim 1 wherein the cross-section shape of said aperture is square.

11. The screw conveyor apparatus of claim 8 wherein the cross-section shape of said aperture is square.

12. The screw conveyor apparatus of claim 5 wherein at least some of said in-register flight members are bonded to each other.

13. The screw conveyor apparatus of claims 1 or 2 further including an outer cylinder encircling and integrally molded with said flight member on each of said multiplicity of plastic modules.

14. The screw conveyor apparatus of claims 1 or 2 wherein said permanently bonded areas between confronting axial ends extend completely around said apertures so as to provide a fluid tight bond between the outside of said axial member where said flights are attached thereto and said elongated aperture extending through said multiplicity of modules.

* * * * *